Figure 1:
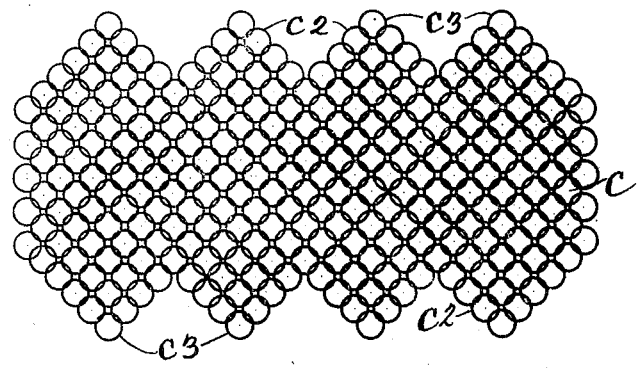

No. 807,167. PATENTED DEC. 12, 1905.
E. B. HAZLETON.
CHAIN ARMOR FOR PNEUMATIC TIRES.
APPLICATION FILED DEC. 29, 1904.

WITNESSES

INVENTOR
Edward Benjamin Hazleton
BY Edgar Tate & Co
ATTORNEYS

UNITED STATES PATENT OFFICE.

EDWARD BENJAMIN HAZLETON, OF SHEFFIELD, ENGLAND.

CHAIN ARMOR FOR PNEUMATIC TIRES.

No. 807,167.        Specification of Letters Patent.        Patented Dec. 12, 1905.

Application filed December 29, 1904. Serial No. 238,707.

*To all whom it may concern:*

Be it known that I, EDWARD BENJAMIN HAZLETON, a subject of the King of Great Britain, residing at Sheffield, in the county of York, England, have invented certain new and useful Improvements in Chain Armors for Pneumatic Tires, of which the following is a specification, such as will enable those skilled in the art to which it appertains to make and use the same.

This invention relates to pneumatic and other tires; and the object thereof is to provide a chain armor for tires of this class particularly adapted for use in connection with the tires of automobiles and other heavy vehicles, but which may be used in connection with pneumatic tires of any kind or class.

The invention is fully disclosed in the following specification, of which the accompanying drawings form a part, in which the separate parts of my improvement are designated by suitable reference characters in each of the views, and in which—

Figure 2:
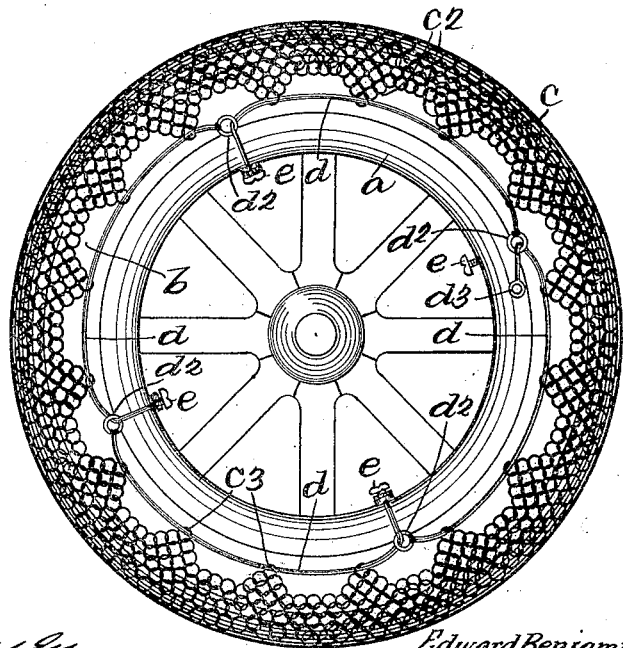

Figure 1 is a plan view of a section of my improved pneumatic-tire armor; Fig. 2, a side view of the wheel of an automobile provided with a pneumatic tire having my improved chain armor.

In the drawings forming part of this specification, reference being made to Fig. 2, I have shown the wheel of an automobile, and this wheel is provided with the usual rim $a$ and a pneumatic tire $b$, which is connected therewith in the usual manner and also provided with my improved chain armor $c$, a part of which is shown extended in Fig. 1. The chain armor $c$ consists of interwoven links made of steel and finely tempered, and the thickness of said links and the size thereof will depend to an extent on the character of the wheel on which the armor is used, it being understood that when the armor is used on automobile-wheels or on the wheels of other heavy vehicles the links from which the armor is made will be made large and thicker in transverse section, especially at the bearing-surface of the wheel.

The armor, as shown in Figs. 1 and 2, or the main part thereof, is wide enough in cross-section to inclose about half of the pneumatic tire or all the bearing-surface thereof and extend up on the sides thereof to about the transverse diameter thereof, and the sides of said armor, as shown in Figs. 1 and 2, are provided at regular intervals with projecting portions $c^2$, and in securing an armor of this form to the tire of a wheel I employ wire cords $d$, as shown in Fig. 2, four of which are employed in the form of construction shown. At each side of the wheel the wire cords $d$ are passed through eyelets $c^3$, which in the form of construction shown consists of the links of the armor at the ends of the projecting portions $c^2$ at the sides of the armor, and each of the wire cords $d$ is provided at one end with an eyelet $d^2$, and the opposite ends of said wire cords are also provided with eyelets $d^3$ and are passed through the eyelets $d^2$ and drawn transversely across the inner side of the rim $a$ and are secured to said rim by means of screws $e$, which are passed through the eyelets $d^3$. In this way the armor $c$ may be securely connected with the tire in such a manner as to hold said armor in firm connection with the tire and prevent its slipping or turning thereon.

In practice, as hereinbefore stated, the links of that portion of the armor which cover the bearing-surface of the tire may be made thicker or heavier where the armor is used on the wheels of heavy vehicles, and where said armor is used on the wheels of light vehicles it may be made to correspond with the demands of the service it is expected to perform, and in the manufacture of the armor the links are tempered, so as to give the same the greatest possible resistance to the wear occasioned by the use thereof.

My improved armor for pneumatic tires cannot be cut or broken and protects the tire from puncture or similar injury, and when made in the manner described the armor will possess all the necessary flexibility and elasticity and will form a perfect protection for the tire, and said armor, as will be understood, may be applied to any kind or class of pneumatic tires as now constructed or used.

Having fully described my invention, what I claim as new, and desire to secure by Letters Patent, is—

1. A chain armor for a pneumatic tire, said armor extending entirely around the tire and inclosing a part of the sides thereof and being provided with side extensions having eyelets, and wire cords passed through said eyelets and secured to the rim of the wheel, substantially as shown and described.

2. A chain armor for a pneumatic tire, said armor extending entirely around the tire and inclosing a part of the sides thereof and being provided with side extensions having eyelets, and wire cords passed through said eyelets and provided with binding members which are passed inwardly, radially and across the rim of the wheel and are secured to the inner side of the rim of the wheel, substantially as shown and described.

In testimony that I claim the foregoing as my invention I have signed my name, in presence of the subscribing witnesses, this 14th day of December, 1904.

EDWARD BENJAMIN HAZLETON.

Witnesses:
 LUTHER J. PARR,
 WILFRED H. SLATER.